US006843455B1

(12) United States Patent
Wentworth et al.

(10) Patent No.: US 6,843,455 B1
(45) Date of Patent: Jan. 18, 2005

(54) OVERHEAD SUPPORT SYSTEM FOR CARWASH COMPONENTS

(76) Inventors: Robert J. Wentworth, 37924 Stableview, Farmington Hills, MI (US) 48335; Michael J. Belanger, 21300 Chase Dr., Novi, MI (US) 48375

( * ) Notice: Subject to any disclaimer, the term of this patent is extended or adjusted under 35 U.S.C. 154(b) by 301 days.

(21) Appl. No.: 10/105,689

(22) Filed: Mar. 25, 2002

(51) Int. Cl.[7] .............................................. E04G 25/00
(52) U.S. Cl. ............................... 248/200.1; 248/228.5; 248/644; 15/316.1; 34/239
(58) Field of Search ............................. 248/200.1, 644, 248/637, 228.5; 403/232.1, 234, 403, 205; 52/712, 702; 15/316.1, 405; 34/239, 240

(56) References Cited

U.S. PATENT DOCUMENTS

| | | | | |
|---|---|---|---|---|
| 591,405 A | * | 10/1897 | Jenkins | 52/326 |
| 923,463 A | * | 6/1909 | Taylor | 410/151 |
| 924,842 A | * | 6/1909 | Seipp | 403/190 |
| 1,445,179 A | * | 2/1923 | Seymour | 248/452 |
| 2,495,408 A | * | 1/1950 | Christoffersen | 248/247 |
| 3,601,833 A | * | 8/1971 | Takeuchi | 15/53.2 |
| 3,626,538 A | * | 12/1971 | Scheuermann | 15/21.1 |
| 3,637,183 A | * | 1/1972 | Sagers | 248/235 |
| 3,939,517 A | * | 2/1976 | Bivens | 15/53.2 |
| 4,643,379 A | * | 2/1987 | Potocnik | 248/49 |
| 4,872,238 A | * | 10/1989 | Crotts et al. | 15/302 |
| 5,044,582 A | * | 9/1991 | Walters | 248/57 |
| 5,167,044 A | * | 12/1992 | Belanger et al. | 15/4 |
| 5,692,791 A | * | 12/1997 | Sulzer | 296/3 |
| 6,053,481 A | * | 4/2000 | Scheide | 256/65.06 |
| 6,095,466 A | * | 8/2000 | Sener et al. | 248/231.61 |
| 6,530,115 B2 | * | 3/2003 | MacNeil | 15/316.1 |
| 6,543,751 B1 | * | 4/2003 | Spruill | 256/65.04 |

* cited by examiner

Primary Examiner—Korie Chan
(74) Attorney, Agent, or Firm—Young & Basile, P.C.

(57) ABSTRACT

Overhead support system for carwash component comprising wall brackets having wall plates and support trays which extend outwardly therefrom to receive a crossbeam in nesting relationship therewith. Clamps are provided for securing the crossbeam to the support brackets in such a way that it is not necessary to drill or otherwise form holes in the crossbeam. In one embodiment blower/dryers are mounted to the crossbeam using clamp type brackets. In another embodiment longitudinal rails are clampingly mounted between two parallel spaced cross rails or beams to receive a longitudinally movable high pressure spray washer.

14 Claims, 6 Drawing Sheets

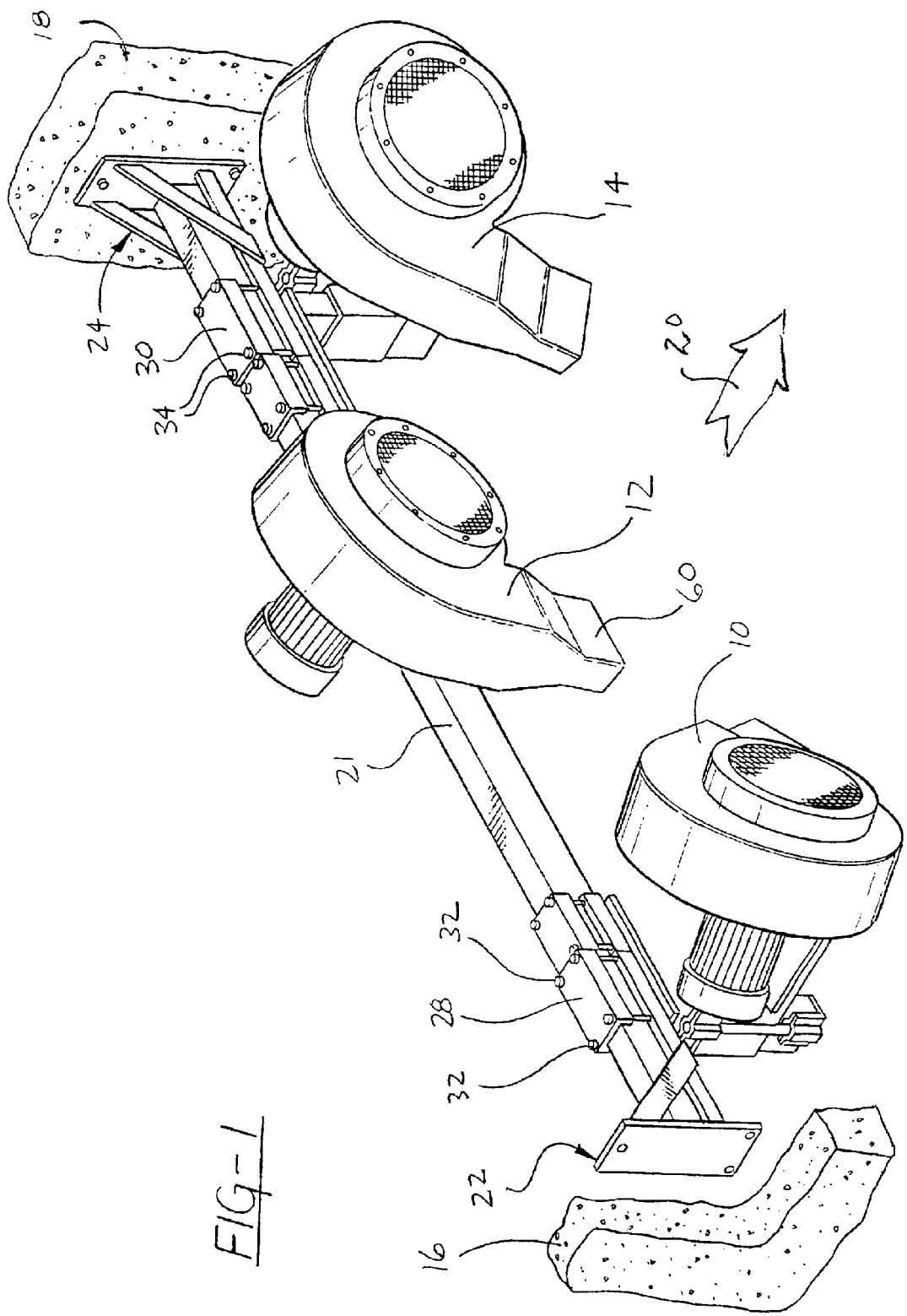

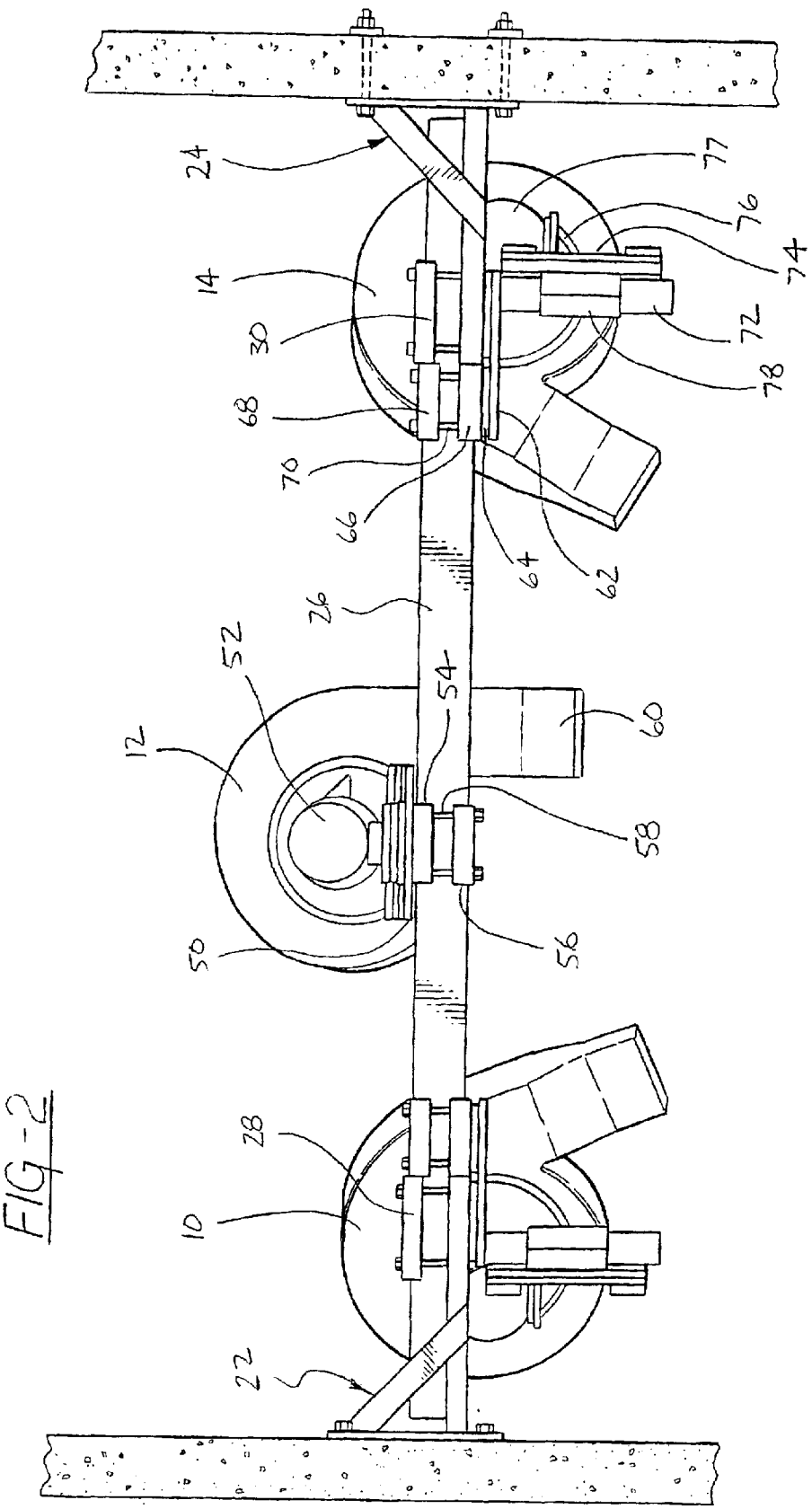

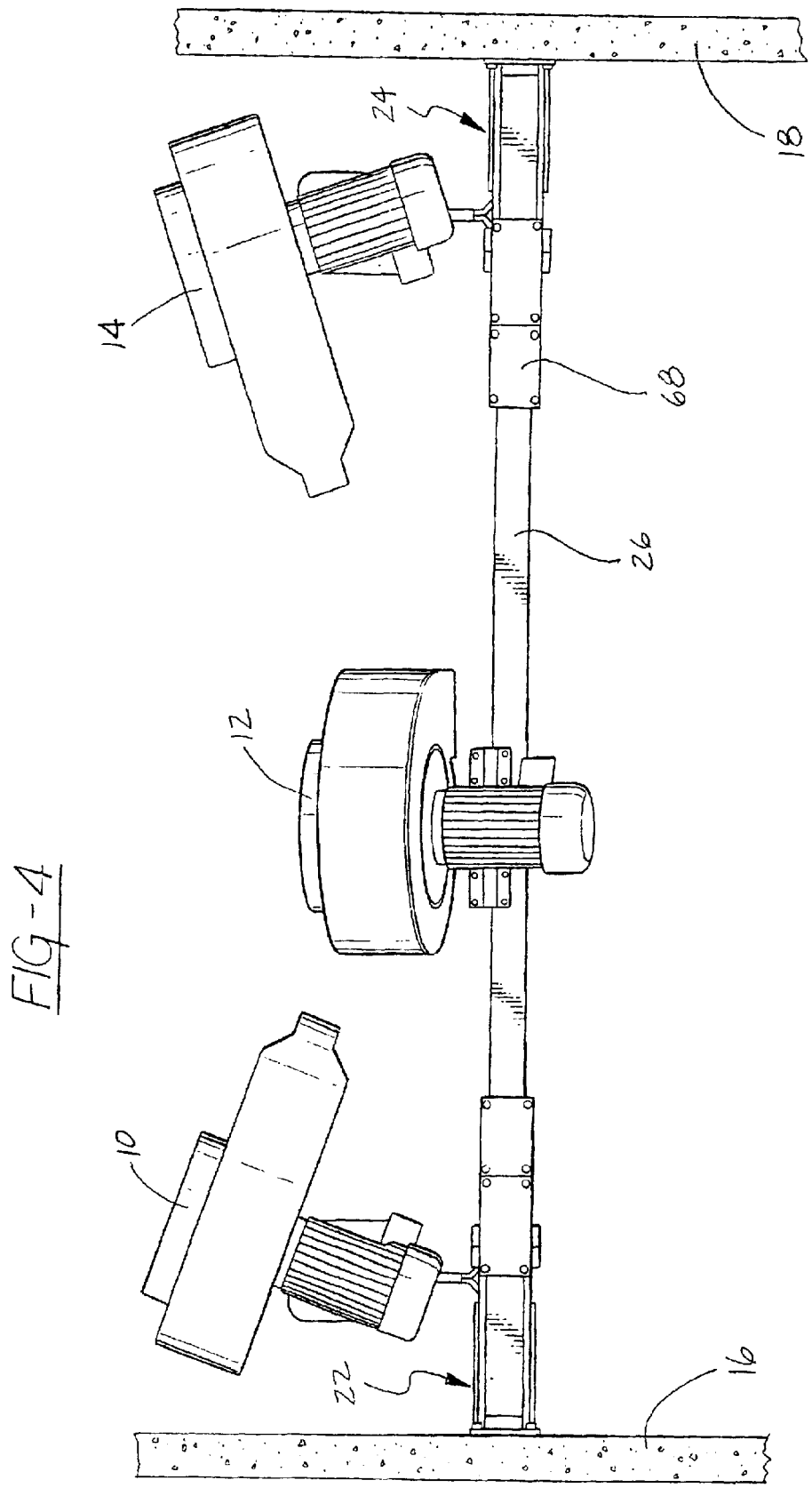

OVERHEAD SUPPORT SYSTEM FOR CARWASH COMPONENTS

FIELD OF THE INVENTION

This invention relates to carwash component support structures and more particularly to an overhead support system which attaches to and extends between parallel building sidewalls so as to eliminate the need for vertical support beams and the like.

BACKGROUND OF THE INVENTION

It is typical in a carwash installation to mount at least some of the carwash components in an overhead fashion; i.e., above the space in which the vehicle is actually washed. The most common way to achieve an overhead support structure is to provide vertical support posts which are bolted into the concrete floor on opposite sides of the wash location. Crossbeams and longitudinal beams may be attached to the vertical posts to form arches and quadrangular structures.

We have found that the presence of vertical supports not only add to the expense and difficulty of installing a carwash system but also presents a number of space utilization limitations. It is our objective to avoid these problems by mounting one or more crossbeams directly to the sidewalls which are disposed on opposite sides of the typical vehicle carwash location. These may be interior or exterior sidewalls or a combination of the two.

SUMMARY OF THE INVENTION

Our invention, in its most basic form, comprises a pair of crossbeam support brackets which are adapted to be secured such as by through bolts to the opposite sidewalls of a carwash location and a crossbeam which rest on and extends between these brackets to receive and support additional carwash components such as spray nozzles, brushes, blower/dryers and the like.

In the preferred form our crossbeam support brackets comprise wall plates which can be made of steel or aluminum of such size and shape as to be bolted to and through the sidewalls of a typical carwash location above and on opposite sides thereof. Each support bracket further comprises a tray which is welded to the wall plate and which extends outwardly therefrom, typically at right angles toward the opposite sidewall. In the preferred form the tray has a bottom plate and side plates to provide a U-shaped receptacle for a crossbeam.

When two such brackets are mounted on opposite sidewalls above a carwash location, the crossbeam may be placed between them in resting relationship on the respective support trays. The structure is completed by means of clamps including inverted U-shaped caps having holes to receive bolts. The bolts extend through the holes and downwardly into tapped holes in the side plates of the trays such that the beam may be releasably, clampingly secured to the brackets with no need to drill or otherwise provide holes in the beam itself. By this arrangement the support brackets can accept a beam of standard length even though the spacing between the sidewalls may vary. Of course beams can be trimmed to the appropriate length where necessary.

In one specific application hereinafter described and illustrated in detail, the crossbeam is used to support two different types of blower/dryers. For example, one or more centrally mounted top dryers can be mounted to the beam using clamp type brackets which permit the dryers to be moved from side-to-side and positioned exactly where desired. Similar brackets can be used to mount side blowers and in this instance the brackets typically include a vertical leg to lower the blower by approximately two-feet where it is possible to direct an air stream toward the lateral side surfaces of the vehicle.

In another specific application hereinafter described and illustrated in detail, the crossbeam systems described above are provided in multiples; i.e., in arrangements where at least two crossbeams are mounted in parallel and are longitudinally spaced above the carwash location. In this arrangement, a pair of parallel spaced apart longitudinal beams are mounted between the crossbeams using clamps which permit release and spacing adjustment as desired. A variety of apparatus may be mounted to the longitudinal beams, the preferred apparatus being that which is described in out co-pending application Ser. No. 09/411,821 for Rollover Pressure Carwash Apparatus and Method of Operating the Same filed Oct. 1, 1999.

As used herein, the term "carwash components" refers to any component which can be mounted overhead in a vehicle laundry installation. The words "car" and "wash" are not used in a limiting sense; i.e., vehicles or parts of vehicles other than "cars" can be treated and "wash" is used to include a dryer.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a perspective view of an overhead support system for carwash blower/dryers;

FIG. 2 is a front view of the apparatus of FIG. 1 looking in the direction of vehicle travel through a wash location;

FIG. 4 is a top plan view of the apparatus of FIGS. 1 and 2;

DESCRIPTION OF THE ILLUSTRATIVE EMBODIMENTS

Figure 5:
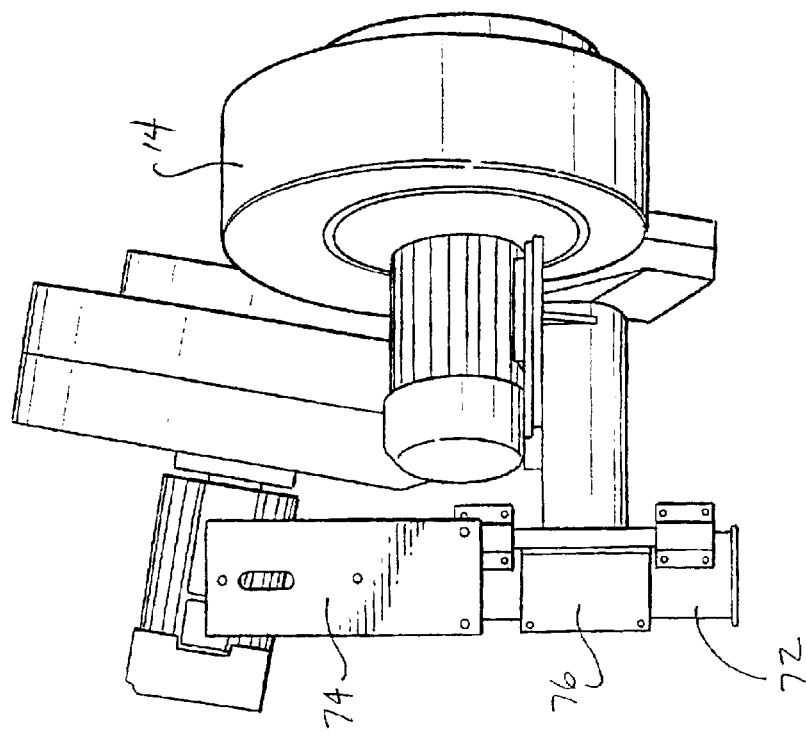
FIG. 5 is a detailed perspective of a side dryer support system for use in the arrangement of FIGS. 1, 2 and 4.

Referring now to FIGS. 1, 2 and 4 there is shown an overhead support system for carwash components; in this case, electric motor driven forced air dryers 10, 12 and 14. The car wash location in which the support system is mounted is defined in part by fixed opposite parallel concrete or masonry sidewalls 16 and 18 which extend upwardly from a floor (not shown). Assuming a drive through or conveyor type of carwash, the direction of vehicle travel under the support system and the components 10, 12 and 14 is shown by the arrow 20. It will be understood by those familiar with carwash systems that an arrangement wherein the vehicle is stationary when washed and/or dryed is also possible.

The overhead support system of the present invention comprises a pair of identical welded metal wall brackets 22 and 24 secured such as by through bolts to the walls 16 and 18 respectively to receive and support a hollow box type crossbeam 26 also sometimes referred to as a cross rail. As hereinafter described with greater detail with reference to FIGS. 2 and 3, the overhead support system further comprises clamp structures including caps 28 and 30 employing bolts 32 and 34 for releasably clamping the beam 26 to the brackets 22 and 24 respectively.

Figure 3:
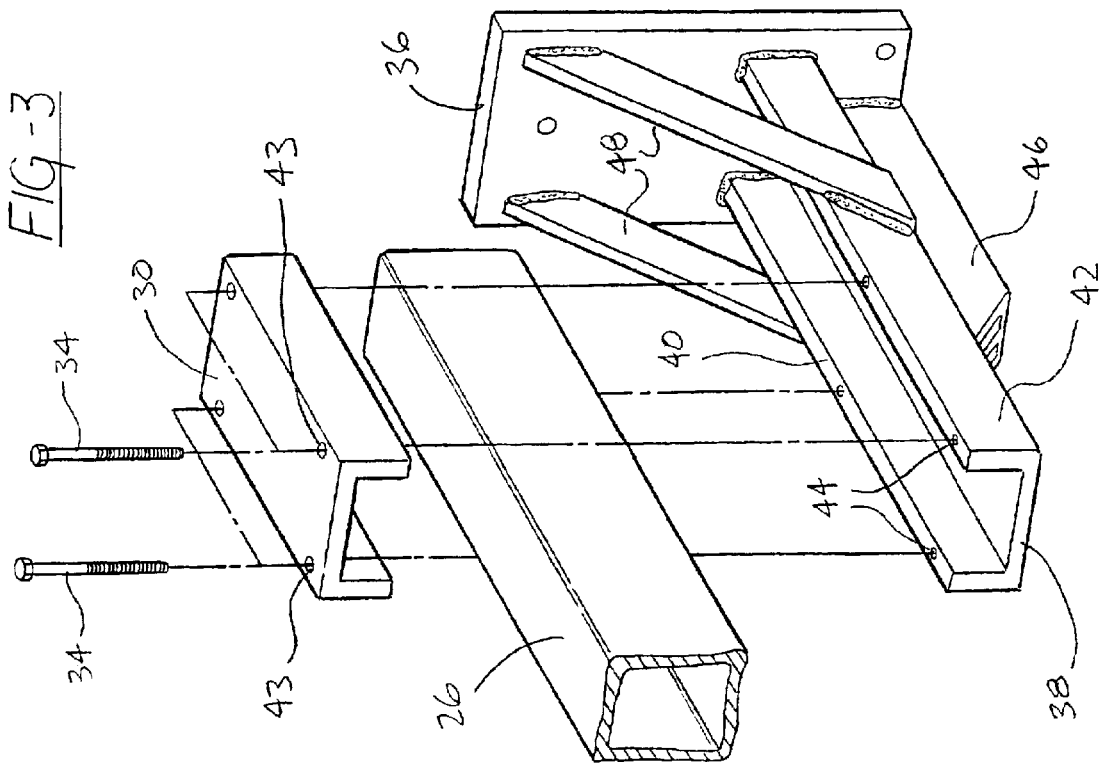
FIG. 3 is a detailed perspective drawing of a crossbeam support bracket in the system of FIGS. 1 and 2 also showing the beam and beam clamp.

Referring now to FIG. 3 in addition to FIGS. 1, 2 and 4, bracket 24 will be described with respect to its individual components as representative of both brackets 22 and 24. Each such bracket comprises a metal wall plate 36 which is essentially flat and rectangular and may be made of steel or aluminum. Attached such as by welding to the plate 36 and extending outwardly therefrom at right angles is a cross beam tray comprising a flat bottom plate 38 and two parallel side rails 40 and 42. The side rails are thick enough to form tapped holes 44 therein to receive the threaded ends of bolts 34 which extend through the holes 43 in the clamp cap 30.

Bracket 24 further comprises a 3-piece bottom brace 46 which is welded at the far end (as seen in FIG. 3) to the plate 36 and along its outside edges to the bottom of the cross rail tray 38. Additional rigidity is provided by means of diagonal truss straps 48 which are welded between the upper portion of the plate 36 and the tray side rails 40 and 42.

In the configuration shown the cross rail trays 38, 40 and 42 provide an essentially U-shaped structure to receive the cross beam 26 in nesting relationship therein. The releasably adjustable clamp comprising cap 30, bolts 34 and the side rails 40 and 42 with the tapped holes 44 accommodates a substantial variation in the location of the beam within the tray; i.e., since the bolts 34 do not pass through the beam but rather straddle the beam 26, there is no need to form holes in the beam and no criticality to the location of the beam 26 relative to the tray 38, 40 and 42 as long as at least 14" of the beam sits on each of the wall bracket trays and provides adequate clamping surface area. However, it is not necessary for the beam to extend all the way to the wall plate 36.

Referring again to FIGS. 1, 2, and 4, the overhead support system comprising brackets 22 and 24 and crossbeam 26 is capable of receiving and supporting a number of different carwash components including spray nozzles, brushes, lights, motors, valves, chemical dispensers and dryer structures such as those shown in FIGS. 1, 2, and 4. In this instance a blower/dryer 12 is mounted centrally of the beam 26 so as to direct an air stream toward the top horizontal surfaces of a vehicle including the hood, roof and rear deck or pick-up truck bed. Again a clamp type mounting arrangement is employed. As best shown in FIG. 2 a deck plate 50 is used to support the electric motor 52 which drives a turbine (not shown) in the blower 12 to create an air stream which is directed downwardly by the nozzle 60. The deck is mounted such as by welding to an inverted U-shaped top clamp 54 which rests atop the beam 26 in stacked relationship so that the blower 12 may be moved back and forth to the left and right as shown in FIG. 2 for precise location purposes. An inverted U-shaped bottom clamp 56, essentially identical to the top clamp 30 described with reference to FIG. 3, is provided. Holes are drilled in the clamp 56 to receive bolts 58 which extend into tapped holes in the side rails of the top clamp 54 in essentially the same way that bolts 37 extend into the tapped holes 44 in the side rails 40 and 42 of the tray 38. Accordingly the clamp 54, 56, 58 may be loosened and/or released, the location of the dryer 12 being precisely chosen by sliding the structure along the beam 56 whereupon the bolts 58 may be tightened to clamp the structure to the beam in the desired location. This permits the entire blower not only to be precisely located but also to be easily installed and removed as needed.

The structure of FIGS. 1, 2 and 4 further comprises somewhat different clamp and mount arrangements for the blower/dryers 10 and 14 as best show in FIGS. 4 and 5. Taking the blower 14 as representative, deck plate 62 which, in the installed condition, resides under the beam 26 is attached such as by welding to a transition plate 64 which is in turn attached by welding a U-shaped bottom clamp 66. A top clamp 68 virtually identical to the cap 30 shown in FIG. 3 completes the clamp assembly by receiving bolts 70 which extend into tapped holes in the U-shaped clamp element 66. Plate 62 is attached to a leg 72 which extends downwardly from the beam 26. A mounting structure comprising welded plates 74 provides a platform for the motor 77 of the blower 14 and clamp element 76 and 78 clamp the platform and deck structure 74, 76 to the beam type leg 72 in such a way that the precise location of the blower 14 may be selected by loosening the clamp 76, 78 and moving the structure up and down as desired. Also the location of the blower 14 may be adjusted laterally by loosening the clamp bolts 70, sliding the structure to the desired location either left or right as shown in FIG. 2 and then tightening the bolt 70 again as desired.

Figure 6:
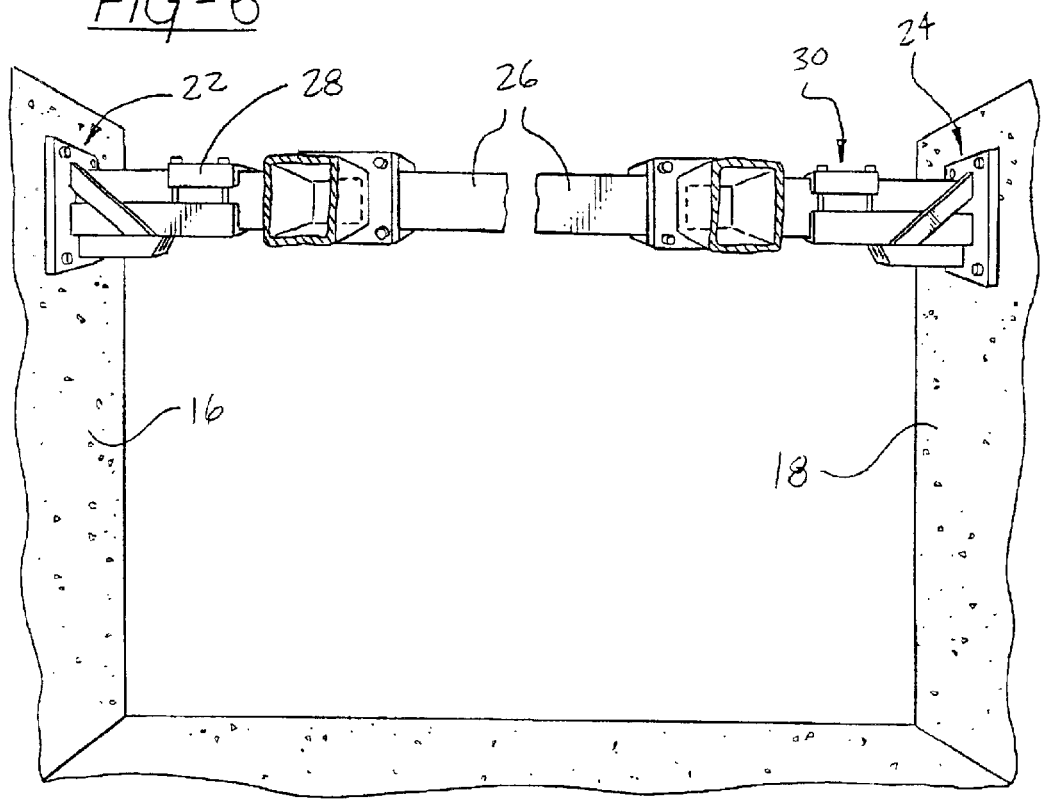
FIG. 6 is a perspective view of a second embodiment/application of the inventive overhead support system for the adjustable support of longitudinal beams.
Figure 8:
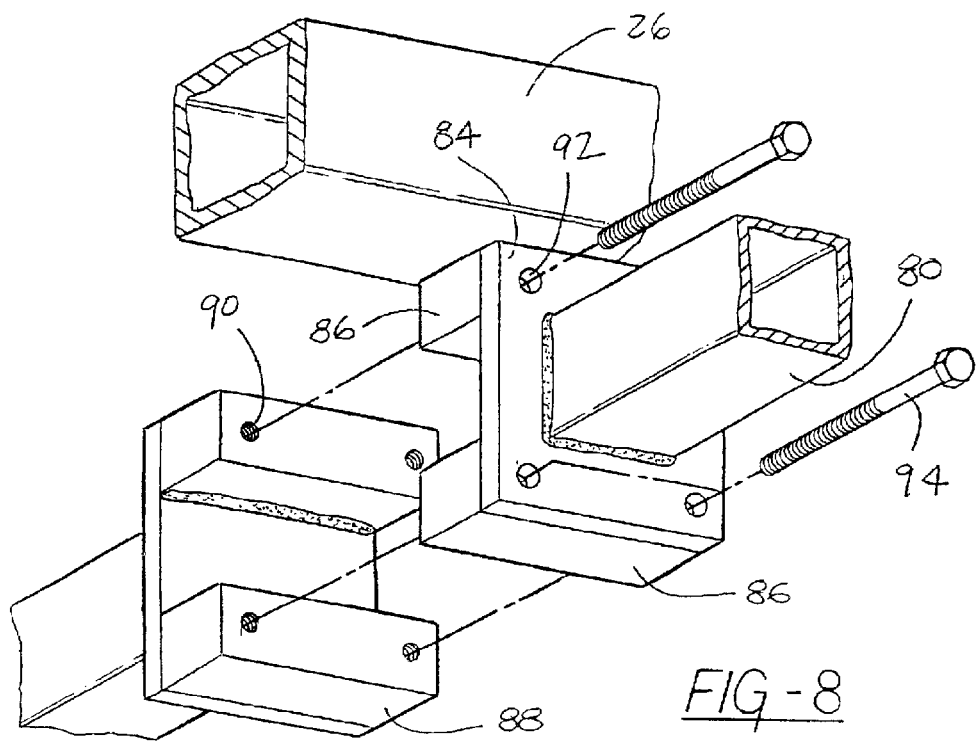
FIG. 8 is a detail of the clamping arrangement used to secure the longitudinal rails in the system of FIG. 7 to the crossbeams.
Figure 7:
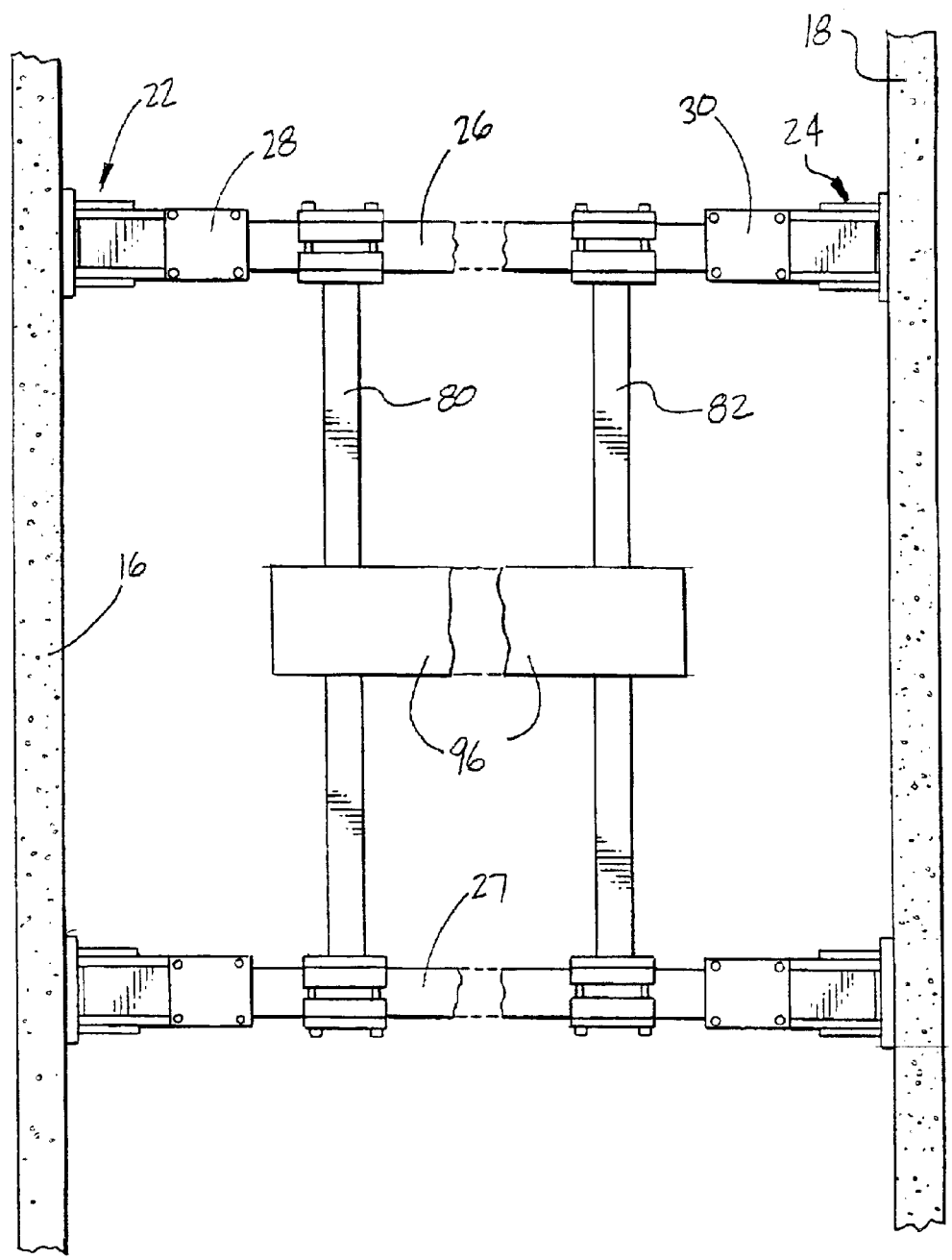
FIG. 7 is a top view of a system using the structure of FIG. 6.

Referring now to FIGS. 6, 7 and 8, an alternative use or application of the crossbeam support structure will be described. Here, as shown in FIGS. 6 and 7, a first crossbeam 26 is mounted between the brackets 22 and 24 as previously described with reference to FIGS. 1-3. In addition a second beam 27 is mounted between the wall 16 and 18 approximately fourteen to twenty-feet from the beam 26 in exactly the same fashion. To this structure longitudinal beams or rails 80 and 82 are added by means of clamps 84, 88 one of which is shown in detail in FIG. 8. Beam 80, for example, has one end welded to a plate 84 having spaced parallel clamp rails 86 through which holes are machined or bored to receive bolts 94. The opposite clamp element 88 is similar in structure to cap 30 and is provided with tapped holes 90 to receive the threaded portions of the bolts 94. Accordingly the beams 80 and 82 may be secured to the cross rails 26 and 27 at any desired location, proper spacing being achieved by loosening the bolts 96 associated with each of the clamp structures and sliding the beams 80 and 82 along the rails 26 and 27 to the desired locations. Thereafter the bolts 94 are tightened. Again no holes need to be formed in the crossbeams 26 and 27 and this is of advantage in that it eliminates weak points as well as areas which must be specially treated to avoid corrosion.

In the embodiment illustrated in FIGS. 6, 7, and 8, the longitudinal beam rails 80, 82 receive a high pressure spray carriage 96 which is preferably of the type described in our co-pending application for Rollover Pressure Carwash Apparatus and Method of Operating the Same under U.S. Ser. No. 09/411,821. Of course other carwash component structures may be mounted on the rails 80, 82 as desired.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. Apparatus for providing overhead support for carwash system components in a location having spaced apart sidewalls comprising:
    first and second crossbeam support brackets for attachment to respective sidewalls above and on opposite sides of a carwash location;
    each of said brackets comprising a wall plate adapted to be secured to a sidewall in face-to-face abutting relationship and a crossbeam support tray extending outwardly from said plate and rigidly secured thereto;
    a rigid crossbeam resting on and extending between said brackets so as to be disposed above and across said location; and
    first and second clamps each including a downwardly opening U shaped top cap fitted over the crossbeam in overlying relation to a respective support tray and fastener devices securing each top cap to the respective support tray and operative to clamp the crossbeam between the respective top cap and the respective support tray;
    wherein each of said top cap has bolt holes and the fastener devices comprise a plurality of bolts for securing said top caps to said trays; and wherein the bolts extend between respective said top caps and said trays in straddling association with said crossbeam.

2. Apparatus as defined in claim 1, wherein each of said bracket trays comprises a bottom plate and parallel upstanding side plates forming a three-sided support for said crossbeam, each said side plates having tapped holes therein for receiving said clamp bolts.

3. Apparatus as defined in claim 1 wherein each of said support brackets comprises a bottom brace secured to said wall plate and to said tray and extending beneath said tray and outwardly from said plate.

4. Apparatus as defined in claim 3 where each of said brackets further comprises a rigid diagonal truss strap secured between the wall plate and the tray at an angle to each said wall plate and said tray.

5. Apparatus as defined in claim 1 further comprising at least one air blower/dryer mounted on said crossbeam above said location.

6. Apparatus as defined in claim 5 wherein said air blower/dryer is disposed on said crossbeam substantially centrally thereof.

7. Apparatus as defined in claim 6 further comprising a clamp for releasably and adjustably securing said blower/dryer to said beam.

8. Apparatus as defined in claim 1 further comprising a pair of blower/dryers mounted to said beam in laterally spaced apart locations.

9. Apparatus as defined in claim 8 wherein each of said blower/dryers comprises a mounting bracket and a clamp for releasably and adjustably securing said mounting bracket to said crossbeams.

10. Apparatus as defined in claim 9 wherein each said mounting bracket includes a vertical leg.

11. Apparatus as defined in claim 1 further comprising at least one overhead support beam extending longitudinally of said location and clamped to said crossbeam at one end.

12. A carwash installation comprising:
    spaced apart sidewalls;
    first and second crossbeam support brackets attached to respective sidewalls above and on opposite sides of a carwash location at a forward end thereof;
    third and fourth crossbeam support brackets attached to respective sidewalls above and on opposite sides of a carwash location at a rearward location thereof;
    each of said brackets comprising a wall plate and a crossbeam support tray extending outwardly from said plate and rigidly secured thereto;
    a first crossbeam resting on and extending between said first and second brackets so as to be disposed above and across said location;
    a second crossbeam resting on and extending between said third and fourth brackets so as to be disposed above and across said location in longitudinally spaced and parallel relationship to said first crossbeam;
    means for clamping said first and second crossbeams to said first and second and third and fourth support brackets respectively;
    wherein said means of clamping comprising a plurality of clamps, each clamp including a downwardly opening U-shaped top cap fitted over the crossbeam in overlying relation to a respective support tray and fastener devices securing each top cap to the respective support tray and operative to clamp the crossbeam between the respective top cap and the respective support tray;
    first and second longitudinal beams extending in spaced parallel relationship between said first and second crossbeams and at right angles to said first and second crossbeams; and
    means for releasably adjustably clamping said first and second longitudinal beams to said crossbeams.

13. A carwash installation as defined in claim 12 further comprising carwash components mounted to said longitudinal beams for displacement therealong.

14. A wall bracket assembly for mounting a crossbeam above a carwash location comprising a planar rigid wall plate; a U shaped upwardly opening beam support tray extending outwardly from said support plate at essentially right angles thereto and including a bottom plate and first and second opposite upstanding parallel side rails secured to the opposite side edges of said bottom plate and defining tapped bolt holes; a U shaped downwardly opening top cap sized to be fitted over the cross-beam adapted to be positioned in the beam support tray and including bolt holes; and
    a plurality of bolts sized to pass through the bolt holes in the cap for threaded engagement with the tapped bolt holes in the side rails to releasably clamp the crossbeam to the support tray;
    wherein the bolts extend between top cap and tray in straddling association with said crossbeam.

* * * * *